Patented Nov. 5, 1935

2,020,024

UNITED STATES PATENT OFFICE 2,020,024

MOLDING COMPOSITION AND METHOD OF PREPARING SAME

Kenneth N. Francisco, Mountainside, N. J., assignor, by mesne assignments, to American Cyanamid Company, a corporation of Maine No Drawing. Application April 22, 1931, Serial No. 532,129

4 Claims. (Cl. 106—22)

This invention relates to a method of preparing urea-formaldehyde molding compositions and the products obtained thereby.

Ordinarily, in the preparation of molding compositions of the urea-formaldehyde type, a cellulose pulp is impregnated with a urea-formaldehyde condensation product or resin. This impregnated material is then dried and ground to form a molding powder. This molding powder has a number of disadvantages due, in part, to the degree of grinding or particle size. If the powder contains too great a percentage of larger particles, the product molded therefrom lacks uniform surface and homogeneity. If the molding powder contains a large percentage of very fine particles, the powder is then unadapted to preforming and even without the preforming step, the molding of the finely divided material is unsatisfactory due to non-uniform curing and the tendency of the powder to entrap air.

In molding compositions of this nature it is evident that uniformity of molding is paramount for a successful utilization of the molding composition. Further, from the standpoint of commercial operation a molding powder, to be successful, should be capable of being pelleted or preformed. Preforming permits ease of handling and gives a desirable molding which is not ordinarily obtained with the usual powder composition.

As has been pointed out, the urea-formaldehyde type resinous molding powders are lacking in the desirable characteristics mentioned. It is one of the principal objects of my invention to prepare a molding composition which will avoid the difficulties of the prior urea-formaldehyde type compositions and which, at the same time, will have the desirable properties of uniform molding and preforming.

This and other objects are attained by preparing a powder of a cellulosic material impregnated with a urea-formaldehyde condensation product, agglomerating this powder into the form of lumps, and then disintegrating the lumps into the finished molding material.

The following specific example of one method of carrying out my invention is given purely by way of illustration and not in limitation.

A urea-thiourea-formaldehyde condensation product is prepared by mixing in a suitable vessel, 2,700 pounds of commercial aqueous formaldehyde (37%) with 888 pounds of thiourea and 700 pounds of urea in the presence of 88 pounds of aqua ammonia (26° Bé.). The mixture is agitated until the solution of the solids is complete, the temperature of reaction being controlled so that it does not exceed 30° C. The mixture is allowed to stand for a suitable period of time, say, about 12 hours, although the time of reaction may be varied widely. The condensation product obtained is in the form of a syrup and may be used immediately or may be stored until desired for use. The syrup, of course, is a water solution of the water-soluble resinous condensation product.

When the syrup is to be used, 408 pounds thereof is added to 133 pounds of disintegrated paper pulp in a Werner-Pfleiderer mixer. The mixer, preferably steam-jacketed, is operated for a period of about 1¼ hours, the mixture being maintained at a temperature of about 70° C. or slightly higher during the mixing, whereupon a considerable amount of water, originally introduced in the formaldehyde, is driven off. At the end of the mixing period, the wet pulp is spread on pans and dried, for instance, in a shelf drier for a period of about 5 hours at a temperature of about 70° C. The material at this point is either neutral or very faintly acid. The dried product is allowed to cool and is then usually ground in a ball mill to the desired state of subdivision when it is screened through a 30 mesh screen to remove unground particles as well as foreign bodies. If the composition is to be colored, this may be done by introducing water soluble dyes into the syrup at the beginning of the mixing operation. If pigmented colors are used, these pigments may be added to the ball mill and are incorporated by means of the grinding operation.

The above described product is the usual type of molding powder and, while it may be used successfully, is difficult to preform and has other disadvantages which are avoided by means of the present invention. One of these is that the powder contains a large proportion of fines in order to obtain uniform molding and this causes entrapment of air with attendant molding difficulties.

The powder prepared as just described is then subjected to further treatment. If the powder contains a comparatively low percentage of the resinous condensation product, it is best mixed with an additional proportion of the syrup prepared, for instance, as above described. Thus, 80 to 85 parts of powder may be mixed with 20 to 15 parts by weight of the syrup in a suitable mixer, the temperature during mixing being preferably maintained at a point between about 40–50° C. The powder is thereby agglomerated into lumps of varying sizes, the mixing being continued until the lumps obtained are substantially homogeneous throughout. The lumps are removed from the mixer or the like, transferred to a shelf drier and dried for about 2 to 5 hours at a temperature of about 70° C. The lumps are then disintegrated in a suitable machine such as one of the swing-hammer type utilizing a screen of about 10 mesh.

The product passing through the screen of the disintegrator is suitable for use as my improved molding composition. It has excellent molding properties giving uniform moldings. Further, this material is susceptible of being pelleted or otherwise being preformed in any of the usual types of high-speed preforming machines. The molding composition prepared, as just described, is of somewhat greater apparent density than the usual type of molding powder and has the obvious advantages resulting from this property, including ease of handling and shipping, as well as permitting its use in a mold without preforming, since the material of greater apparent density obviates the necessity of a mold cavity as large as would be necessary if the original powder were used. Even without preforming my material, the molded products obtained are uniform and homogeneous.

The agglomeration of the original molding powder, as described, was obtained by treating such powder with the urea-formaldehyde type condensation product syrup. However, the same result is obtained by agglomerating powder into lumps with water, particularly where the powder contains a comparatively large proportion of resin. Since the condensation product exists in the powder in a water-soluble state, the agglomeration in the presence of water is successful because of the fact that the water dissolves sufficient of the condensation product to give a solution substantially equivalent to the syrup previously described. The other steps of the process and the results obtained are substantially the same.

The methods used are susceptible of many variations without departing from the spirit of the invention. In making a colored molding composition, the dye, instead of being added in the preparation of the original powder, may be introduced with the syrup in the agglomeration of the powder.

Further, any suitable type of cellulose pulp or other cellulosic material may be used as the filler material. For instance, I may impregnate sheets of paper with the syrup, drying and grinding the impregnated sheets to form the powder to be agglomerated.

The range of particle size of the finished product may vary within wide limits. Thus, suitable molding materials have been prepared which include particles as large as about 4 mesh and ranging down to about 300 mesh and finer, although it is usually desirable that the final product contain not over 50% of fines of less than 80 mesh. The particle size of the original powder prior to agglomeration is not of especial importance although it is usually preferred to have a material, the major proportion of which is less than 80 mesh.

Another modification involves the disintegration of the agglomerated lumps before drying, and then drying the disintegrated particles. It will be obvious that such a method will give a somewhat more efficient drying than is obtained with the lumps although the disintegration of the moist lumps is somewhat less expedient than disintegration of the dry lumps. Further, in agglomerating the powder with the syrup, it has been found to be a general rule that agglomeration takes place efficiently at lower temperatures when larger proportions of syrup are used. Thus, when using 30 parts syrup with 70 parts powder, by weight, agglomeration can be carried out successfully and efficiently at room temperatures.

As has been pointed out, the molding materials formed in accordance with the present invention are susceptible of preforming without loss of uniformity in the finished molded article. By molding with compositions containing molding materials of different colors, very pleasing mottled effects may be obtained in the usual manner by avoiding thorough mixing of the colored materials. Likewise, a pellet or the like may be made up of molding compositions of several different colors, avoiding thorough mixing, and thereby obtaining a preform which will give a mottled molding product.

Another advantage of the procedure followed herein is that the original powder prepared may be of comparatively low resin content. This enables me to disintegrate or grind the impregnated pulp in various types of mills and the like, with correspondingly greater capacity and speed of grinding, without injury to the composition in any manner. As the percentage of condensation product to filler increases, with respect to the original material, additional precautions are usually necessary to obtain the desired degree of disintegration without precuring or otherwise adversely affecting the product. For instance, in grinding in a ball mill, care is usually necessary to prevent the heat developed in the grinding operation from partially precuring the condensation product, since the resin content of the material being ground is usually fairly high.

Wherever I have referred to a urea-formaldehyde type resin or condensation product, I mean this term to include the combination of formaldehyde with urea, thiourea, mixtures of the two in all proportions, suitable derivatives of these compounds, or such mixtures of these various materials as may be desirable.

It will be evident that the invention is susceptible of many changes and variations such as to proportions, temperatures, and the like without departing from the spirit and scope thereof except as defined in the appended claims.

I claim:

1. The method of preparing a urea-formaldehyde molding composition which comprises impregnating a cellulosic filler with a urea-formaldehyde condensation product, drying and grinding the impregnated filler to a powder, agglomerating the powder into lumps with an aqueous solution of a urea-formaldehyde condensation product, disintegrating the lumps into relatively dense granules, preforming the granules under pressure to give a product which can be molded under heat and pressure with the formation of strong and uniform moldings.

2. The method of preparing a urea-formaldehyde molding composition which comprises impregnating a cellulosic filler with a urea-formaldehyde condensation product, drying and grinding the impregnated filler to a powder, agglomerating the powder into lumps with an aqueous liquid, and disintegrating the lumps into relatively dense granules, all of which pass through a 4 mesh screen and not more than 50% of which pass through an 80 mesh screen, whereby the granules can be preformed under pressure and can be molded under heat and pressure to give strong and uniform moldings.

3. A molding composition comprising a relatively dense granular urea-formaldehyde material capable of being preformed under pressure and of being molded under heat and pressure to give uniform products, said composition having the characteristics of a product produced by the process of claim 1.

4. A molding composition comprising a relatively dense granular urea-formaldehyde material capable of being preformed under pressure and of being molded under heat and pressure to give uniform products, said composition having the characteristics of a product produced by the process of claim 2.

KENNETH N. FRANCISCO.